United States Patent [19]

Sweeney

[11] 4,143,922
[45] Mar. 13, 1979

[54] METHOD OF MULTIPLE POINT INJECTION FOR SLURRY PIPELINES

[75] Inventor: William T. Sweeney, Ponca City, Okla.

[73] Assignee: Continental Oil Company, Ponca City, Okla.

[21] Appl. No.: 868,925

[22] Filed: Jan. 12, 1978

[51] Int. Cl.² ............................................. B65G 53/30
[52] U.S. Cl. ......................................... 302/14; 299/1; 299/18
[58] Field of Search ....................... 302/14, 15, 27, 66; 299/1, 18

[56] References Cited

U.S. PATENT DOCUMENTS

| | | | |
|---|---|---|---|
| 3,260,548 | 7/1966 | Reichl | 302/14 |
| 3,565,491 | 2/1971 | Frazier | 302/14 |
| 3,942,841 | 3/1976 | McCain et al. | 302/14 |

Primary Examiner—Robert B. Reeves
Assistant Examiner—Jeffrey V. Nase
Attorney, Agent, or Firm—William J. Miller

[57] ABSTRACT

A method for maintaining suitable velocity or velocity range in a slurry pipeline system of the type with a water pipeline return and slurried material pipeline output with more than one slurry injection point. A single set of primary pipelines, one water and one slurry, is able to serve multiple points of hydraulic injection by means of slurry pipeline flowmeters downstream from each slurry injection water bypass junction, with each flowmeter actuating water control valves to bypass water to the slurry pipeline at the respective junction so as to maintain slurry pipeline velocity within prescribed limits.

8 Claims, 1 Drawing Figure

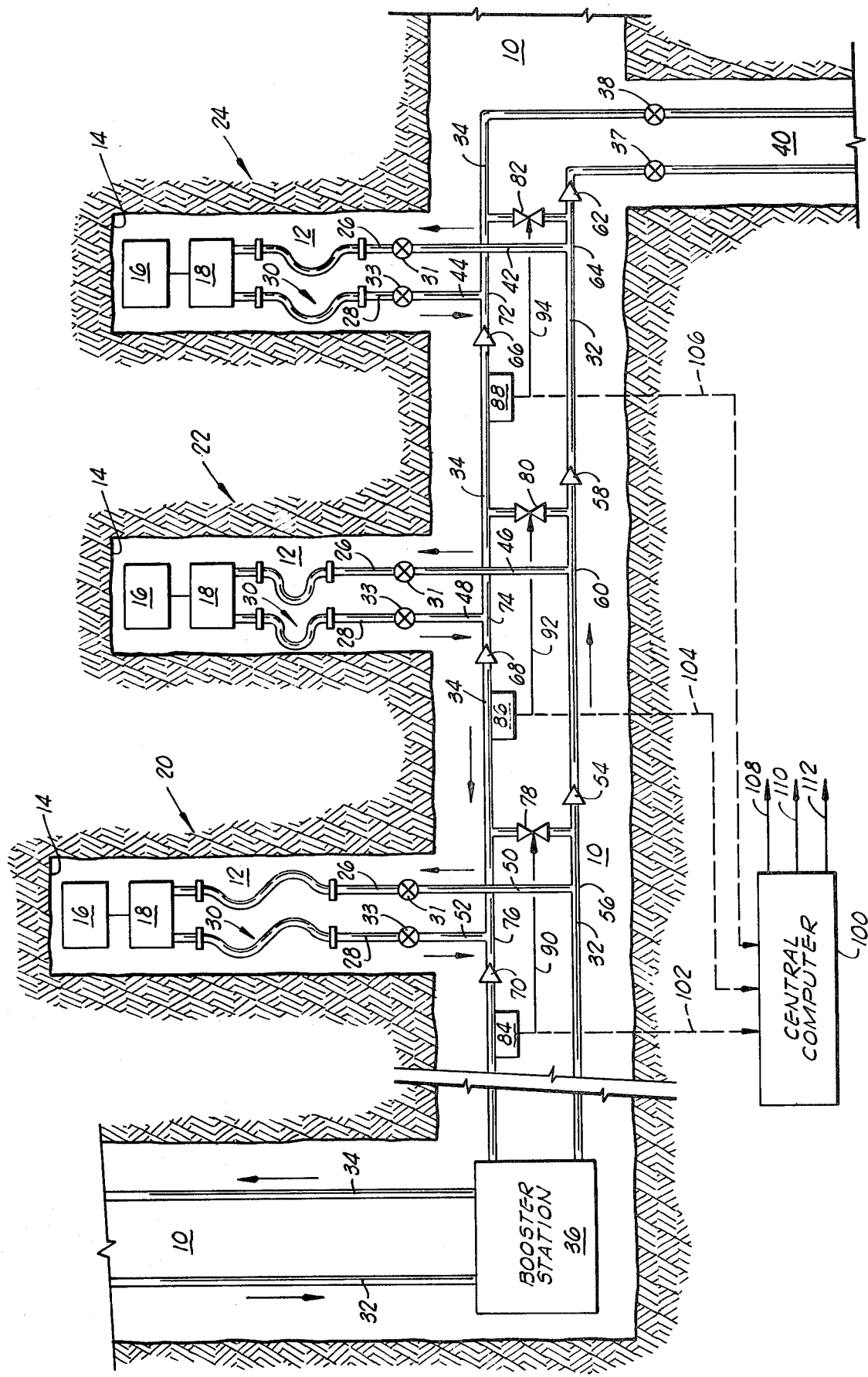

METHOD OF MULTIPLE POINT INJECTION FOR SLURRY PIPELINES

BACKGROUND OF THE INVENTION

1. Field of the Invention

The invention relates generally to hydraulic transport of solids and, more particularly, but not by way of limitation, it relates to an improved coal slurry pipeline system enabling a plurality of hydraulic injection stations.

2. Description of the Prior Art

The prior art includes numerous teachings that relate to solids transport by slurry methods, and recent developments in the coal mining industry have seen many developments relating to hydraulically transported coal solids. One of the primary teachings with respect to coal slurry transportation is U.S. Pat. No. 3,260,548, "Method and Apparatus for Continuously Mining and Transporting Coal" as issued on July 12, 1966 in the name of Reichl. This patent deals with the transportation of newly mined coal from the mine face through mine corridors and requisite booster stations to a final depository or terminal station. The patent deals with the basic operation of slurry forming and transportation under hydraulic pressure from a single mine face, an art which has been highly developed since. The U.S. Pat. No. 3,405,976 in the name of Anderson et al. was found to be of interest because it dealt with a single circulating slurry line capable of forming stable suspensions of iron ore, the circulating system including two parallel arrayed hopper tanks providing granulated input to the concentration system. The invention is primarily directed to the transportation of granular iron ore by forming a stable suspension of iron ore, bentonite and water.

SUMMARY OF THE INVENTION

The present invention contemplates the transport of solids in slurry from a plurality of injection stations through a single pair of primary pipelines, a slurry line and a water return line. Flowmeters located downstream on the primary slurry line from each injection station/water bypass junction are used to actuate water control valves thereby to control water input from the primary water pipeline and maintain a suitable velocity range in the slurry pipeline.

Pipe size reducers are suitably located between injection stations in the primary slurry and/or water pipelines.

Therefore, it is an object of the present invention to provide an improved slurry pipeline system of the type that receives input from a multiple of hydraulic injection stations.

It is also an object of the invention to provide for multiple inputs while maintaining line velocity within prescribed limits at all locations throughout the system.

Other objects and advantages of the invention will be evident from the following detailed description when read in conjunction with the accompanying drawing which illustrates the invention.

BRIEF DESCRIPTION OF THE DRAWING

The single FIGURE is a plan view of a mine layout illustrating a slurry pipeline system carrying out the method of the invention.

DETAILED DESCRIPTION OF THE INVENTION

Referring to the drawing, there is shown a portion of a typical coal mine layout including mine passage 10 having a plurality of rooms 12 extending therefrom is generally parallel alignment. In conventional manner, a series of rooms 12 are developed to extend laterally from the mine passages 10 as the coal is removed from the seam at mine faces 14. Working at each mine face 14 is the coal removing apparatus which may in present practice be a ripper type mining machine 16 of the continuous mining type.

Immediately behind mining machines 16 are their respective coactive mobile slurry preparation terminals 18. The terminals 18 are positively linked to each respective mining machine 16 and they serve to crush the mined solids to requisite average size and to mix the solids into slurry form for transport to the primary pipelines. Such mining machine 16 and preparation terminals 18 are known and commercially available in the technology and their interactive employ at the mine face is fully disclosed in the aforementioned U.S. Pat. No. 3,260,548.

Each of the mining and slurry equipments adjacent the mine face 14 constitutes a solids injection station in the overall system. Hence, injection stations 20, 22 and 24 includes identical system structure consisting of a mining machine 16, preparation terminal 18, water input line 26 and slurry output line 28. Each of the water input line 26 and slurry output line 28 in each injection station also includes a flexible hose portion 30 which is provided to enable a slack reserve of water and slurry line as the mining machine 16 moves forward or rearward adjacent mine face 14. The water input lines 26 are controlled as to volume flow rate by means of control valves 31.

The primary pipelines as run through the mine passages 10 consist of a water line 32 and a slurry line 34 and, depending upon the length of the primary pipelines, a plurality of booster stations 36 are provided along the primary pipeline route to insure sufficient and relatively constant flow rate of the slurried materials. For purposes of illustration, the water line 32 and slurry line 34 are shown receiving injection of slurried material from the three injection stations 20, 22 and 24 with the slurry system terminated by closure of valves 37 and 38; however, it should be understood that the system could be terminated in yet another injection point as might be located at a mine face within room 40.

As regards injection station 24, input water from primary line 32 is input via branch line 42 as controlled by valve 31 for slurry mixing in preparation terminal 18 with return of slurry through valve 33 and branch line 44 to the primary slurry line 34. In like manner, branch lines 46 and 48 provide interconnection to injection station 22 and branch lines 50 and 52 interconnect with injection station 20 to place all injection systems on the primary pipeline system.

Pipe size reducers may be used along each of the water and slurry primary pipelines 32 and 34 in order to optimize the velocity and pressure drop characteristics in the primary pipelines. Thus, in the primary water pipeline 32, a first pipe reducer 54 reduces pipeline size after water junction 56 leading to injection station 20. In like manner, a pipe reducer 58 is located downstream of water junction 60 of station 22 and a pipe reducer 62 is located downstream of junction 64 of injection station 24. In the slurry pipeline 34, the line is similarly expanded by pipe expanders 66, 68 and 70 located downstream from respective primary slurry line junctions 72, 74 and 76.

Electrically actuatable control valves 78, 80 and 82 are then connected in cross-connection between primary water pipeline 32 and primary slurry pipeline 34 in close proximity to the respective water line junctions 56, 60 and 64 to control water bypass for the individual injection stations 20, 22 and 24. Flowmeters 84, 86 and 88 are installed in the primary slurry pipeline 34 downstream from the slurry line pipe expanders 70, 68 and 66, respectively. Electrical output from flowmeter 84 via line 90 is applied to actuate control valve 78 within the system of injection station 20; similarly, flowmeter 86 provides electrical output via line 92 to actuate control valve 80 for the system of injection station 22, and output on line 94 from flowmeter 88 actuates control valve 82. The flowmeters 84, 86 and 88 may be a well-known type of magnetic flowmeter as is commercially available from the Foxboro Controls Corporation of Foxboro, Mass. Also, the control valve 78, 80 and 82 may be a standard form of actuatable control valve of the V-ball type as are also commercially available from the Fisher Controls Company of Marshalltown, Iowa.

Totally optimized control of the primary pipelines 32 and 34 may be achieved with the use of a central computer 100. Thus, the electrical output indications from the individual station sensing flowmeters 84, 86 and 88 as present on dashlines 102, 104 and 106 may be applied to central computer 100 for interactive processing and subsequent output of control actuation signals via lines 108, 110 and 112, respectively, to control valves 78, 80 and 82. The central computer 100 may be such as a special purpose digital electronic hardware of recent generation microcomputer types, e.g., that using microprocessor circuitry and resident program; or in many instances, a general purpose computer will be available on facility for use in performing additional functions in the overall mining operation. Thus, signals generated at each point of measurement can be used along or in conjunction with other data input to the computer 100 to effect controlled time-sharing injection on a tight or highly complex primary pipeline system thereby to optimize throughput of slurry to the terminal.

In operation, the flowmeter/control valve combinations for each of the plurality of injection stations, e.g., 20, 22 and 24, serve to bypass varying amounts of additional water from the primary water line 32 to the primary slurry line 34 in order to maintain a suitable velocity or velocity range in the slurry primary pipeline 34. This desired velocity will be maintained regardless of the operating cycle of the individual input or injection station that is located immediately upstream from the point of flow measurement.

The foregoing discloses a novel method for transporting slurried particulate material as may be injected from a plurality of individual source points along a primary transport line system. The method achieves controlled velocity in the primary slurry line by incremental bypass addition of water from the primary water line. This may be done despite fluctuations in operating cycle of the slurry input or injection at the multiple injection stations. While the foregoing invention is described with particular attention to slurry line transport of mined coal material within a mine layout, it should be understood that the similar system can be used for hydraulic transport of any type of particulate material which lends itself to the slurry suspension procedures.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. A method for injecting particulated solids from more than one source into a slurry and water return primary pipeline system, comprising the steps of:
   connecting each source via a slurry and water line to said respective slurry and water return primary pipelines; and
   sensing the velocity of flow of the slurry primary pipeline downstream from each source slurry line connection and controlling the velocity of flow of water from the water primary pipeline directly into the slurry primary pipeline in approximate inverse proportion thereto.

2. A method as set forth in claim 1 which further includes the steps of:
   reducing the diameter of the water return primary pipeline by a pre-set amount downstream from the water line junction at each source.

3. A method as set forth in claim 1 which is further characterized to include the steps of:
   expanding the diameter of the slurry primary pipeline by a pre-set amount downstream from the slurry line junction at each source.

4. A method as set forth in claim 2 which is further characterized to include the steps of:
   expanding the diameter of the slurry primary pipeline by a pre-set amount downstream from the slurry line junction at each source.

5. A system for transporting a slurry of particulated solids as injected at more than one source to a selected terminal, comprising:
   a primary pipeline including a slurry pipeline and water pipeline return extending from the source area to a selected terminal;
   at least two sources each functioning to form slurried particulate material;
   at least two water lines connected to said water pipeline and extending in parallel from said water pipeline to respective sources;
   at least two slurry lines connected to said slurry pipeline and extending in parallel from said sources to said slurry pipeline;
   at least two flow sensing means connected to sense velocity of flow in said slurry pipeline; each flow sensing means being connected downstream of the connection of each slurry line to said slurry pipeline and to provide representative electrical signal output; and
   at least two bypass conduits including flow controlling control valves connected between said water pipeline and said slurry pipeline; each bypass conduit being connected to said water pipeline downstream of each water line, said control valves controlling water flow therethrough in accordance with said representative electrical output signals.

6. A system as set forth in claim 5 which is further characterized to include:
   at least two pipe size reducers each connected in said water pipeline downstream from each bypass conduit.

7. A system as set forth in claim 5 which is further characterized to include:
   at least two pipe size expansions located in said slurry pipeline immediately downstream of each slurry line connection.

8. A system as set forth in claim 6 which is further characterized to include:
   at least two pipe size expansions located in said slurry pipeline immediately downstream of each slurry line connection.

* * * * *